(12) United States Patent
Salem

(10) Patent No.: US 7,080,287 B2
(45) Date of Patent: Jul. 18, 2006

(54) FIRST FAILURE DATA CAPTURE

(75) Inventor: Hany A. Salem, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 10/195,181

(22) Filed: Jul. 11, 2002

(65) Prior Publication Data

US 2004/0024726 A1 Feb. 5, 2004

(51) Int. Cl.
*G06F 11/36* (2006.01)

(52) U.S. Cl. .............. 714/38; 714/25; 714/26; 706/45

(58) Field of Classification Search .......... 714/25, 714/26, 30, 38; 706/45
See application file for complete search history.

(56) References Cited

U.S. PATENT DOCUMENTS

| | | | |
|---|---|---|---|
| 5,107,500 A | | 4/1992 | Wakamoto et al. |
| 5,127,005 A | * | 6/1992 | Oda et al. ............... 714/26 |
| 5,161,158 A | * | 11/1992 | Chakravarty et al. ..... 714/26 |
| 5,170,480 A | | 12/1992 | Moran et al. |
| 5,331,476 A | | 7/1994 | Fry et al. |
| 5,423,025 A | | 6/1995 | Goldman et al. |
| 5,539,877 A | | 7/1996 | Winokur et al. |
| 5,956,714 A | | 9/1999 | Condon |
| 5,978,594 A | | 11/1999 | Bonnell et al. |
| 5,983,364 A | * | 11/1999 | Bortcosh et al. ......... 714/25 |
| 6,105,067 A | | 8/2000 | Batra |
| 6,170,067 B1 | | 1/2001 | Liu et al. |
| 6,182,086 B1 | | 1/2001 | Lomet et al. |
| 6,249,755 B1 | | 6/2001 | Yemini et al. |
| 6,343,236 B1 | | 1/2002 | Gibson et al. |
| 6,363,497 B1 | | 3/2002 | Chrabaszcz |
| 6,615,367 B1 | * | 9/2003 | Unkle et al. .............. 714/26 |
| 6,681,344 B1 | | 1/2004 | Andrew |
| 6,738,928 B1 | * | 5/2004 | Brown ..................... 714/26 |
| 6,742,141 B1 | | 5/2004 | Miller |

FOREIGN PATENT DOCUMENTS

WO  WO0068793 A1  11/2000

OTHER PUBLICATIONS

Horstmann, et al., *Core Java 2*, vol. 1, Ch. 11, pp. 635-691 (2001).

* cited by examiner

*Primary Examiner*—Robert Beausoliel
*Assistant Examiner*—Joseph D Manoskey
(74) *Attorney, Agent, or Firm*—Stephen J. Walder, Jr.; David A. Mims, Jr.

(57) ABSTRACT

An example of a solution provided here comprises: selecting an incident that requires further processing, capturing data associated with said incident, outputting captured data, and outputting a description for said captured data, whereby problem-solving is promoted. Another example comprises: providing runtime features for data capture, selecting an incident that requires further processing, capturing data on a thread that encounters said incident, and outputting captured data. In some cases, such a solution might include comparing a current incident to known incidents, and if a match is found, retrieving information that is relevant to said current incident. In some cases, such a solution might include taking recovery action or corrective action in response to said incident. Methods for handling errors, systems for executing such methods, and instructions on a computer-usable medium, for executing such methods, are provided.

39 Claims, 4 Drawing Sheets

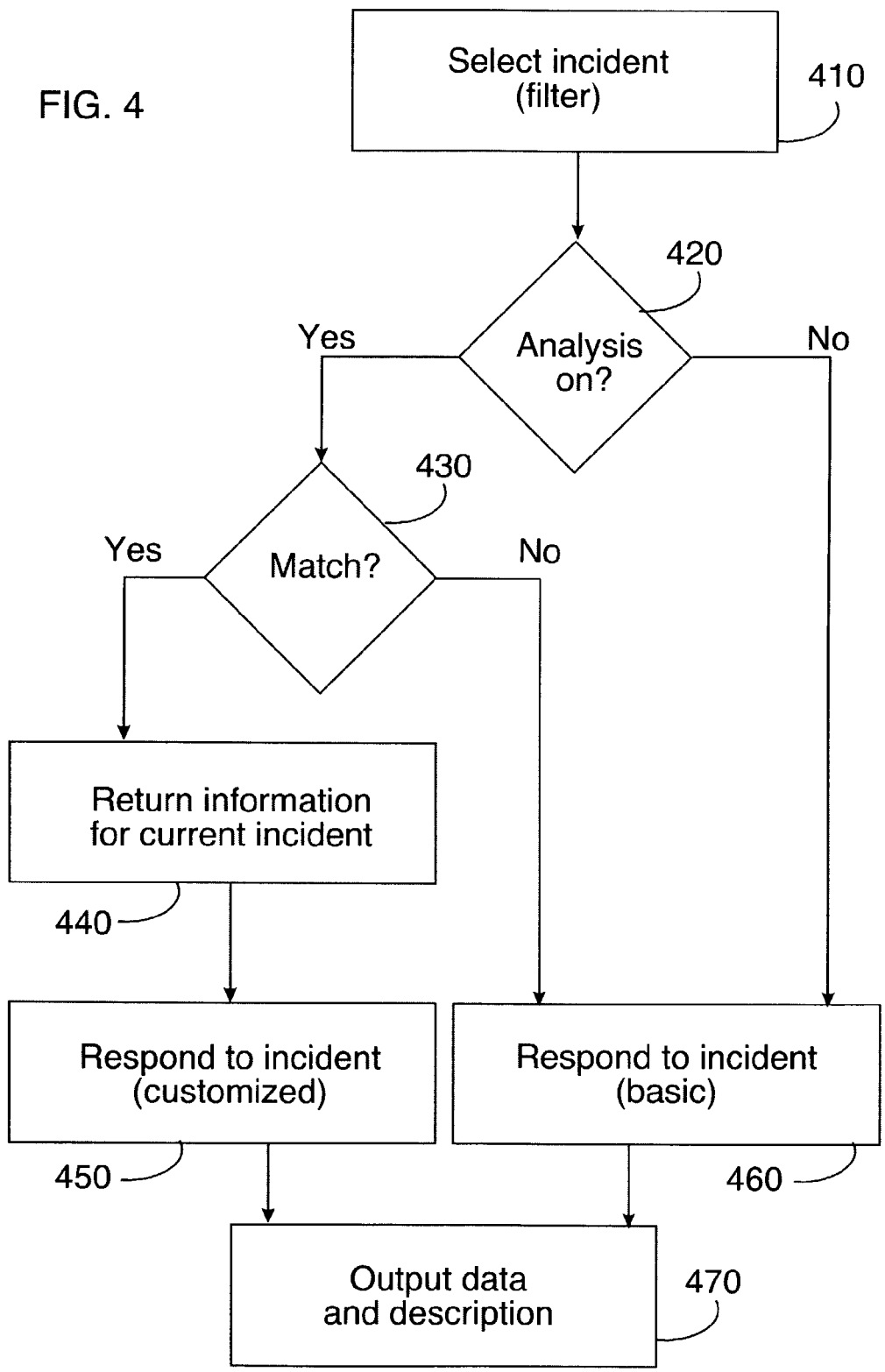

FIRST FAILURE DATA CAPTURE

CROSS-REFERENCES TO RELATED APPLICATIONS, AND COPYRIGHT NOTICE

The present application is related to co-pending applications entitled Error Analysis Fed from a Knowledge Base, filed on even date herewith. These co-pending applications are assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to error handling, recovery, and problem solving, for software and information-handling systems.

BACKGROUND OF THE INVENTION

Various approaches have been proposed for handling errors or failures in computers. Examples include U.S. Pat No. 6,170,067, System for Automatically Reporting a System Failure in a Server (Liu et al., Jan. 2, 2001); it involves monitoring functions such as cooling fan speed, processor operating temperature, and power supply. However, this example does not address software errors. Another example is U.S. Pat. No. 5,423,025 (Goldman et al., Jun. 6, 1995); it involves an error-handling mechanism for a controller, in a large-scale computer using the IBM ESA/390 architecture. In the above-mentioned examples, error-handling is not flexible; error-handling is not separated from hardware, and there is no dynamic tuning.

Unfortunately, conventional problem-solving for software often involves prolonged data-gathering and debugging. Collection of diagnostic data, if done in conventional ways, may impact software performance in unacceptable ways, and may have to be repeated several times until a problem's cause is revealed. Thus there is a need for automated solutions that provide useful diagnostic data, leading to a useful response; at the same time, the burdens of reproducing problems and tracing problems need to be reduced, and the destabilizing effects of major code revisions need to be avoided.

SUMMARY OF THE INVENTION

An example of a solution to problems mentioned above comprises: selecting an incident that requires further processing, capturing data associated with said incident, outputting captured data, and outputting a description for said captured data, whereby problem-solving is promoted. Another example comprises: providing runtime features for data capture, selecting an incident that requires further processing, capturing data on a thread that encounters said incident, and outputting captured data.

In some cases, such a solution might include comparing a current incident to known incidents, and if a match is found, retrieving information that is relevant to said current incident. In some cases, such a solution might include taking recovery action or corrective action in response to said incident.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

FIG. 4 is a flow chart illustrating an example of a method for handling errors according to the present invention.

DETAILED DESCRIPTION

The examples that follow involve the use of one or more computers and may involve the use of one or more communications networks. The present invention is not limited as to the type of computer on which it runs, and not limited as to the type of network used. Some of the examples that follow have been implemented by using object-oriented programming with the JAVA programming language; however, the invention could be implemented with another programming language. Some of the examples that follow have been implemented for handling errors in web application server software; however, the invention could be implemented for handling errors in any kind of software product or software component.

The following are definitions of terms used in the description of the present invention and in the claims:

"Comparing" means bringing together for the purpose of finding any likeness or difference, including a quantitative or qualitative likeness or difference. "Comparing" may involve answering questions including but not limited to: "Does a given item match any element of a set of known items?" Or "Is a measured value greater than a threshold value?"

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Customize" means to adapt, adjust or tune.

"Error" means any event that may be unexpected, undesirable, or incorrect.

"First failure data capture" (FFDC) refers to automated solutions that are typically "on" and ready to work the first time an error or failure occurs; it also refers to reducing the burdens of problem reproduction and repetitive data capture.

"Incident" means any event that may be perceived as a cause of past, present, or future trouble.

"Outputting" means producing, transmitting, or turning out in some manner, including but not limited to writing to disk, printing on paper, or displaying on a screen, or using an audio device.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
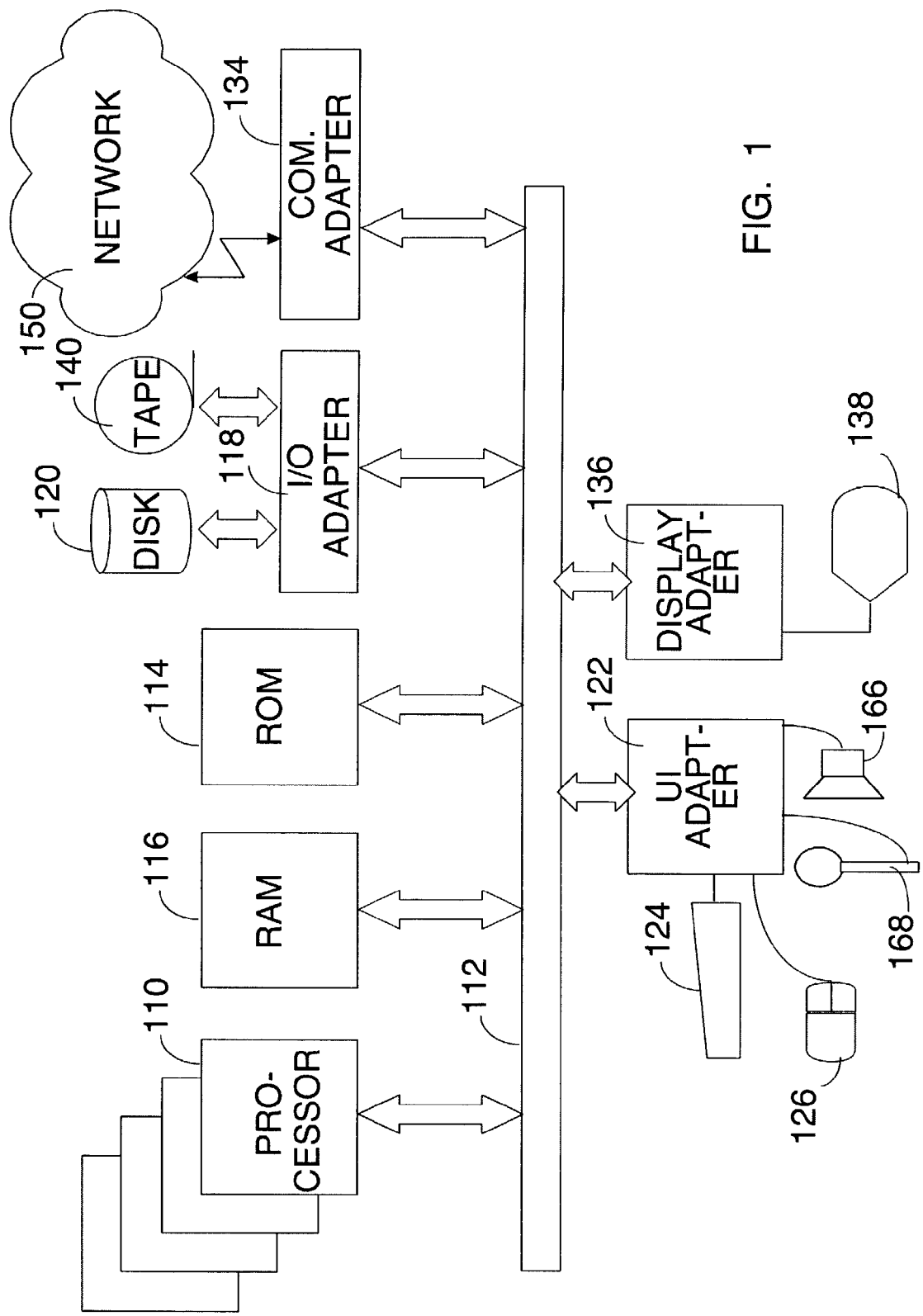
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
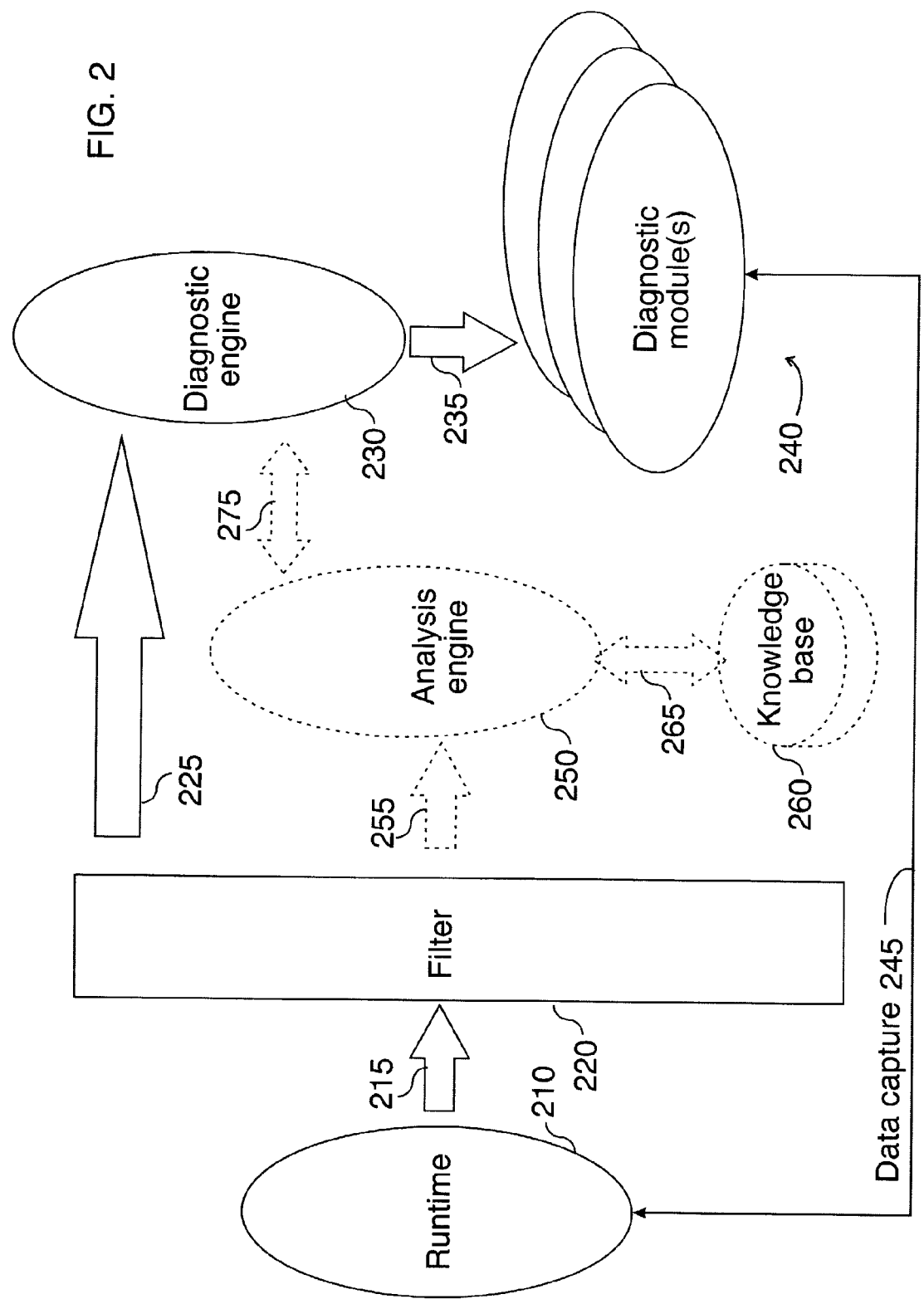
FIG. 2 is a block diagram illustrating an example of a method and system for handling errors according to the present invention.

FIG. 2 is a block diagram illustrating an example of a method and system for handling errors according to the present invention. To begin with an overview, FIG. 2 shows filter 220 selecting an incident that requires further processing, and one or more diagnostic modules at 240 capturing data on a thread that encounters said incident, from runtime 210. Features for data capture were provided in runtime 210. An example like this may also involve outputting captured data (not shown in FIG. 2; see FIGS. 3 and 4). Arrows 225 and 255 symbolize flow of selected incidents in FIG. 2.

To begin a more detailed description of the example in FIG. 2, consider how an application or software component (symbolized by runtime 210) might utilize such a method and system for handling errors. One or more diagnostic modules 240 per software component were provided. Data was made available to diagnostic modules 240, at key places in the code, to help collect volatile data if an incident occurred. An example implementation involved providing runtime features (in runtime 210) for data capture. These features included transferring control to at least one data-capture engine when an incident occurred, creating diagnostic module(s) 240 (one or more diagnostic modules per component), registering diagnostic module(s) 240 with a diagnostic engine 230 (one diagnostic engine per thread), and making data available to diagnostic module(s) 240. An example implementation involved minimizing in-line code for data capture, or keeping code for data capture substantially separate from in-line paths, symbolized by showing one or more diagnostic modules at 240 separate from runtime 210 in FIG. 2.

Data capture (symbolized by double-headed arrow 245) involved bundling an incident in a persistent form that gathered data from multiple components. Data capture 245 comprised at least one action chosen from: producing a thread dump; producing a process dump; and producing a core dump. Data capture 245 in some cases comprised parsing exceptions (arrow 215 symbolizes exceptions, errors, or events), and based on said parsing exceptions, selecting data for capture. This was one way of accomplishing customized data capture, in addition to basic, generalized data capture.

There was another way in which data capture was customized. This customization was implemented by using analysis engine 250 and knowledge base 260. These two components, along with arrows 255, 265, and 275 (arrows showing communication with other components), are drawn in broken lines in FIG. 2, to symbolize that these are optional features. Using these optional features was a way of customizing data capture, based on a particular incident's characteristics. In an example implementation, analysis engine 250 compared a current incident to known incidents in knowledge base 260. If a match was found in knowledge base 260, information that was relevant to the current incident was retrieved from knowledge base 260. This retrieved information was used to customize data capture 245. Arrow 265 shows communication between analysis engine 250 and knowledge base 260.

An example implementation isolated one or more FFDC entities (such as analysis engine 250) from the specific features of any particular computing platform or product. On the other hand, some functions were associated with a specific computing platform or product, to utilize First Failure Data Capture in that platform or product. A platform-specific diagnostic engine 230 was utilized. A "Utils" class or interface represented platform-specific functions. Platform-specific functions comprised:

initiating boundaries for an incident;
    capturing general data for said incident;
    logging data from components that were involved with said incident; and
    bundling output when processing was complete.

Initiating boundaries further comprised actions such as associating an incident with an output stream, or creating an output stream for said incident. Capturing general data further comprised capturing items such as date, timestamp, classpath, class loader, and configuration settings.

An example implementation suppressed data capture during certain states. Our prototype demonstrated that many benign errors could occur before steady state operation was attained. For that reason, suppressing data capture during certain states may be desirable. Some of these states may be: process initialization, process termination or shutdown, application initalization and others. It was the responsibility of the Utils implementation to define states where data capture could be suppressed.

In an example implementation, the Utils class provided a service to facilitate temporarily logging data that could be retrieved later if an incident occurred. The programming model was such that the data was logged during normal runtime processing, and the data was retrieved by the diagnostic module 240 that was interested. This facility allowed for automatic stack data capture.

Filter 220 was a first recipient of incidents, errors, or events; it was a means for selecting incidents that required further processing. Filtering was done according to criteria such as the severity of an error, or the type of exception. An Incident object was created by the filter and passed to other core FFDC entities. In an example implementation, filter 220 was also known as a "High Performance Filter" (HPF). Since all errors were routed to this filter, the filtration process was considered a high performance path. Functions of filter 220 included maintaining a list of incident types that required further processing, and preventing multiple invocation of data capture for the same incident. Filter 220 had an associated configuration file to list incidents that required further processing. It was also responsible for preventing multiple invocation of the remaining FFDC engines for the same incident by accessing the list of recent incidents processed by the diagnostic engine 230. Since filter 220 was the first FFDC engine that was called for incidents, it was the gate for FFDC. Disabling filter 220 essentially disabled FFDC.

Filter 220 filtered errors based on configuration settings. The filter 220 could be tuned, enabled, and disabled dynamically by updating its configuration settings. With rapid parsing techniques, incidents could be checked against the configuration settings for filtering. A simple implementation could be used for a tactical solution. Additionally, the diagnostic engine (DE) 230 was responsible for providing a set of previously handled incidents so that cascaded incidents were not subject to further processing. Cascaded incident analysis could be enabled for severe conditions. This option could be specified in the configuration settings. FFDC could be disabled at server initialization or during other states (e.g. shutdown, etc.). If a server would not start or encountered start up problems, the persistent form of the configuration setting could be updated prior to server startup, to enable processing of all incidents.

Calls from the runtime 210 were made to a method to forward exceptions to the filter 220. This was a method that was injected into runtime code of various components to participate in FFDC. These calls were made on error paths that were candidates for FFDC.

The filter 220 located a diagnostic engine 230 (DE) for the thread. The DE 230 provided a cache of recent incidents that played a role in the decision for continuing FFDC processing, or simply returning control to the runtime 210 without further processing. If FFDC processing was to be continued, an Incident object was created. An analysis engine (AE) 250 was located, if one was configured. A method to analyze the incident (e.g. AE.analyze(lncident)) was called and directives might be found. These along with the Incident and the object pointer were passed to the DE 230.

Analysis engine 250 was a means for comparing a current incident to known incidents, and a means for customizing responses. In an example implementation, analysis engine 250 was also known as a "Log Analysis Engine." Analysis engine 250, an optional component, helped provide dynamic tuning information for incident handling. This information was referred to as "directives." For increased flexibility, a diagnostic module 240 could be implemented to follow directives when available. Directives were stored in knowledge base 260. Analysis engine 250 matched an incident against a set of known incidents and provided additional information, directive(s), that could assist a diagnostic module 240 in customizing the data that was captured and logged.

A knowledge base 260 was a repository of information such as symptoms, directives, suggested workarounds and explanations. A knowledge base 260 provided input to analysis engine 250. When an Incident was sent to analysis engine 250 [via a method call to analyze the incident, e.g. AE.analyze(lncident)], this incident was compared to the repository, and if a match was found the associated directives were returned as a string array. The last entry in the array was the message or associated text that was normally displayed by the analysis engine 250. If no match is found, a null was returned.

An example implementation provided access to a knowledge base 260 via a web site. Knowledge base 260 was updated, and updated information was provided to users, utilizing familiar techniques for providing dynamic content through a web site. Thus any user could obtain updated information and benefit from other users' experience. Knowledge base 260 could be implemented by using IBM's DB2 technology, or other database management software could be used, such as ORACLE, INFORMIX, SYBASE, MYSQL, Microsoft Corporation's SQL SERVER, or similar software.

Control flow for incidents was orchestrated by the diagnostic engine 230 (DE). The diagnostic engine 230 was responsible for the distribution of an incident to the corresponding component. The DE 230 controlled the flow among diagnostic modules 240 for data collection. The diagnostic engine 230 was a dynamic class loader, parent, and invoker of diagnostic modules 240. The diagnostic engine 230 also provided platform-specific utilities for diagnostic modules 240, such as thread dump, core dump, etc., that diagnostic modules 240 could call for global data collection. The diagnostic engine 230 provided common methods for diagnostic modules 240. One instance of a diagnostic engine 230 was created per thread.

Diagnostic module(s) 240 (DM) were a means for capturing data; they were a data-gathering class for a component or sub-component. Diagnostic module(s) 240 were organized into a single class, rather than implementing disparate routines in various places of component code to handle incidents. DM 240 code was kept separate from in-line paths. Diagnostic module(s) 240 were developed and maintained by components participating in FFDC. Diagnostic module(s) 240 provided data that was beneficial to diagnose a problem. Diagnostic module(s) 240 assisted the DE 230 in control flow for the current Incident.

Here is a list of some functions performed by diagnostic module(s) 240: calling DE 230's services when appropriate to request thread dumps, core dumps etc.; parsing and processing directives specified by symptom files (supplied by DE 230); pulling and logging stacked data that was pushed for a component; performing generic data capture in the absence of directives (this would be a typical or common set of data that was gathered when diagnosing a problem in an area); parsing exceptions and collecting specific data that pertained to the situation; providing descriptions for the data that was dumped, so that data was easy for service personnel to understand.

Figure 3:
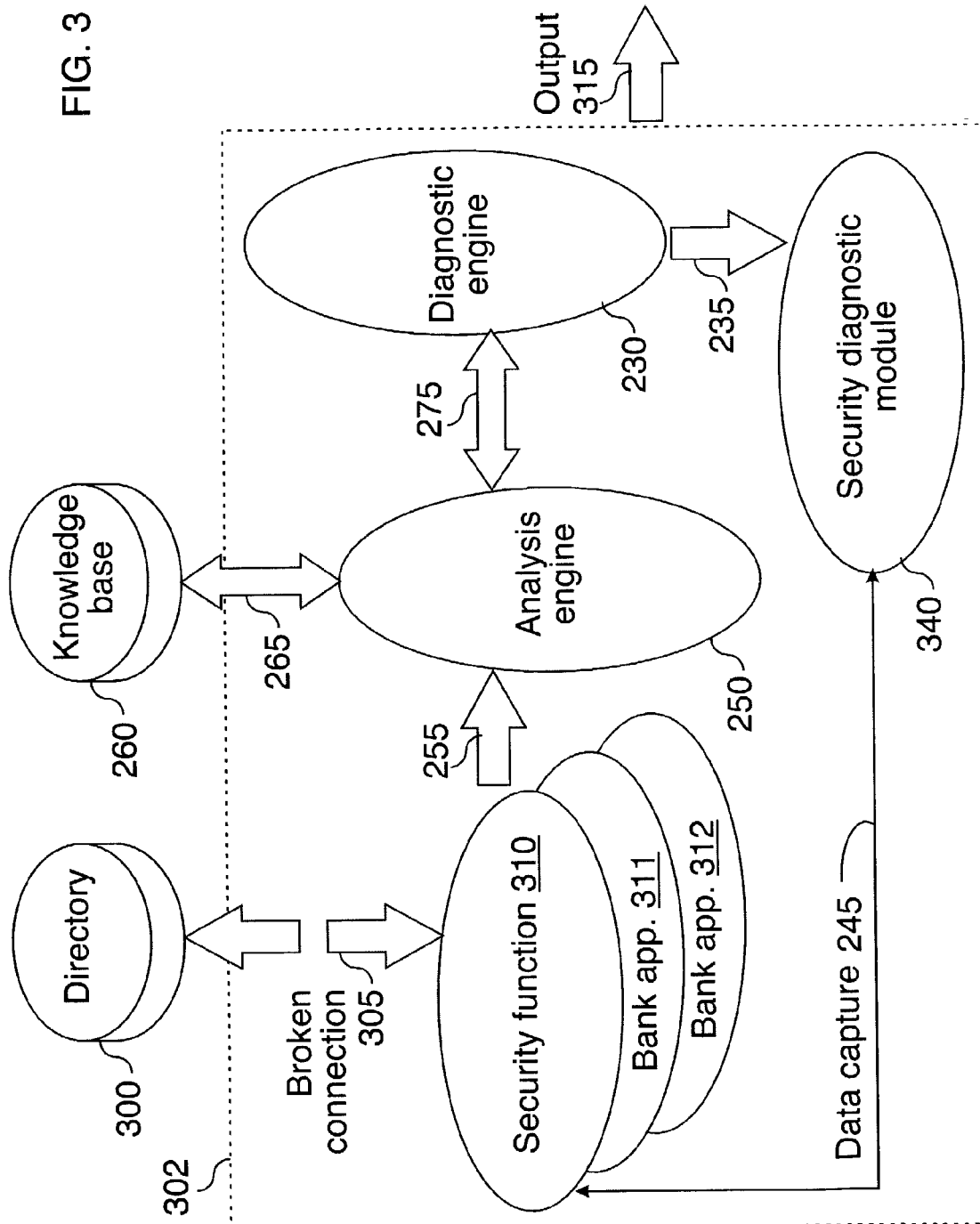
FIG. 3 is a block diagram illustrating a method and system for handling errors, with a hypothetical online banking example.

FIG. 3 is a block diagram illustrating a method and system for handling errors, with a hypothetical online banking example. To begin with an overview of this example, a set of applications such as security function 310, bank application 311, and bank application 312 are designed to allow bank customers to conduct financial transactions via the Internet. Normally, a customer would be authenticated before completing a transaction. Successful authentication requires security function 310 to communicate with directory 300. However, in this example broken connection 305 prevents authentication. FIG. 3 shows analysis engine 250 receiving an incident (arrow 255). In this example, the incident involves broken connection 305 to directory 300. FIG. 3 shows security diagnostic module 340 capturing data associated with said incident, from security function 310. For example, security diagnostic module 340 may probe the state of security function 310. The example in FIG. 3 also involves outputting captured data, and outputting a description for said captured data (arrow 315) whereby problem-solving is promoted. FIG. 3 is a simplified diagram that (unlike FIG. 2) does not show filter 220, selecting an incident that requires further processing.

As indicated by the dashed line, the components analysis engine 250 and knowledge base 260 may be incorporated into one computer system 302, or these components may be incorporated into separate computer systems independent of, but accessible to, one another. Arrow 265 shows communication between analysis engine 250 and knowledge base 260.

For example, analysis engine 250 may get directives, appropriate for this incident, from knowledge base 260. Directives from knowledge base 260 may provide a means for customizing data capture, based on an incident's characteristics. For example, a directive from knowledge base 260 may instruct security diagnostic module 340 to probe for network status at the time of the incident.

Diagnostic modules (e.g. security diagnostic module 340) would be a means for providing output 315. Providing output at 315 may comprise providing a notification message (e.g. via an administration console or other forms of centralized monitoring) to indicate that data capture for an Incident has occurred, and that data is available at that time. Providing output at 315 may comprise describing captured data, and describing a context for said captured data, whereby problem-solving is promoted. For example, output at 315 may include a message to an operator, such as: "User cannot be authenticated. Security function 310 cannot connect to directory 300." The following is another security-related example of output at 315:

Security Component FFDC Data:
Unexpected Exception:
<exception name>
<call stack>
A Security Exception was caught during com.ibm.websphere.security.passwordVerify("******") for user "joe".

The credentials of the user appear to have expired. The captured data shows:

Current Time: 12:21 pm, Credentials creation time: 12:01, credential expiration interval:
20 minutes.
Query issued to retrieve user from LTPA on dummy.ldap.server.com:389 is: "cn=. . . "LDAP Specific error=. . .
Cache value of data from Security Vault is: . . .
Dump of active user data from SecurityLTPACache:
John Smith, cn=, , , ou=, , , cred created at: 11:17 am, expiration 11:37 am, etc.

The above example is hypothetical; however, it demonstrates how incident data can be made easier to comprehend, whereby problem-solving is promoted.

An example like the one in FIG. 3 may involve temporarily logging data that could be retrieved later if an incident occurred. The following is another security-related example: if a login is occurring, the security runtime (security function 310) may opt to push the user name or CN in case an exception happens. In security diagnostic module 340, the user identity can be retrieved and logged. The data can also be used to capture artifacts that are related to it (e.g. uid='joe'). Security diagnostic module 340 may choose to extract cache state for this user (e.g. credential timeout, expiration, age).

An example like the one in FIG. 3 may involve taking corrective action, or recovery action, in response to an incident Corrective action could be automatic, or could involve some human intervention. In the example of FIG. 3, involving a broken connection 305 to directory 300, a directive such as "try to reconnect to directory 300" might be retrieved from knowledge base 260. Thus, by automatically following this directive, security function 310 could be reconnected to directory 300. Obtaining a proper directive and taking corrective action could be accomplished through security diagnostic module 340. Consider other examples of corrective action: issuing a warning to the Java virtual machine or operating system about a condition (e.g. resource shortage) that contributed to the incident, or issuing an action message to the operator.

In another example of corrective acton or self-healing, a DM (e.g. security diagnostic module 340) may request an automated download and application of a fix, that could be made effective instantly or at the next restart. Self tuning could also be performed using this conduit. For example, if a value exceeds a certain threshold, an intentional Incident could be created and handed to the filter (FIG. 3 is a simplified diagram that, unlike FIG. 2, does not show filter 220). The Diagnostic Module that handles the incident could analyze the Incident and perform self-tuning (e.g. increase or decrease a thread pool size). A set of known conditions may only occur in some environments and impact system throughput. Feeding some of these conditions, if they occur, to the FFDC engines and providing tuning parameters through directives would be another example of corrective action.

An example like the one in FIG. 3 may involve performing operations on multiple servers. FIG. 3 is a simplified diagram; electronic banking or other electronic transactions may actually involve at least one network and two or more servers. In an example of multiple servers, a first transaction diagnostic module on a first server may determine that an error originated on a second server. The first transaction diagnostic module may send a request to invoke a second, remote, transaction diagnostic module for data capture on a second server.

FIG. 4 is a flow chart illustrating an example of a method for handling errors according to the present invention. This example begins at block 410, selecting an incident that requires further processing. At this point, for example, calls from the runtime are made to a method to forward exceptions to a filter. With rapid parsing techniques, errors can be checked against configuration settings for filtering. Filtering may be done according to criteria such as the severity of an error, or the type of exception. The DE provides a cache of recent incidents that play a role in the decision to continue processing, or simply returning control to the runtime without further processing. If processing is to be continued, an Incident object is created.

At decision 420, the path depends on whether an analysis function or analysis engine is enabled. In the example of FIG. 2, optional analysis engine 250 and knowledge base 260 were described. Table 1 summarizes options that may be utilized for analysis and diagnostics. Also see FIG. 2 and the description of analysis engine 250 and diagnostic engine 230.

TABLE 1

SETTINGS FOR ANALYSIS ENGINE (AE) AND DIAGNOSTIC ENGINE (DE)

| | DE | |
|---|---|---|
| AE | OFF | ON |
| OFF | No problem analysis. No data capture. | Non-customized, basic data capture. |

TABLE 1-continued

SETTINGS FOR ANALYSIS ENGINE (AE)
AND DIAGNOSTIC ENGINE (DE)

|    | DE | |
| --- | --- | --- |
| AE | OFF | ON |
| ON | Problem analysis. No data capture. Good for software development. | Problem analysis and customized data capture (full FFDC function). |

If analysis is not enabled, the "No" branch is taken at decision 420, and the next action is at block 460, basic response. Non-customized, basic data capture is an example of a basic response. On the other hand, if analysis is enabled, the "Yes" branch is taken at decision 420. For example, an AE is located, if one is configured. The next action is comparing a current incident to known incidents, at decision 430: does the current incident match a known incident? A method to analyze the incident [e.g. AE.analyze(lncident)] is called and directives may be found. If the current incident does not match a known incident, the "No" branch is taken at decision 430, and the next action is at block 460, a basic response. On the other hand, if the current incident matches a known incident, the "Yes" branch is taken at decision 430, and the next action is at block 440, returning or retrieving information that is relevant to the current incident. For example, this may involve returning or retrieving one or more items such as directives, solutions, work-arounds, and explanations.

This leads to a customized response at block 450. For example, this may involve one or more responses such as taking corrective action, providing a message, and capturing data. Consider data capture as a response. An incident may be bundled into a single persistent form that gathers data from multiple components. For efficiency, the data can be persisted as its size grows or at the completion of data gathering. Consider customized data capture as an example: a DM for a connection manager may be implemented to handle the directive strings: "dump_sql_statement", "dump_result_set", etc. Assuming that the default action for an SQL error 972 results in capturing the SQL statement but not the result set, a directive to dump the result set in the case of SQL error 972 could be easily added. The preceding example shows directives in the form of string arrays. To extend the example, consider how directives could give a troubleshooter the flexibility to request additional data under certain conditions. This could be achieved with no code changes in a DM operating in a production environment. Directive strings could be added to a knowledge base.

The last action in this example is outputting captured data, at block 460. The incident may be post processed to produce output that is easy to comprehend. Diagnostic Modules (DM's) may provide output data that is as self descriptive as possible to eliminate post processing, or provide tools for post processing. The diagnostic engine may request additional data to be provided by several components, through their respective DM's, to form a complete state or snapshot at the time of the incident. The additional components may be those present on the call stack or those called directly. The captured data should be written in a format that permits easy navigation.

One example is making the incident data readable by a servlet that is provided for FFDC. Customers could then grant service personnel and developers secure online access to FFDC data via this servlet. The servlet would allow development and support teams to browse and search incident data. Utilizing this servlet and granting access to service personnel would enable instant, remote, problem investigation.

A convention could be established for naming incident data files. An incident would generate a separate persistent file with a unique name. The following is an example:
<log location>%incident%<processid>%<threadid>%<timestamp>
where "%" may be a "/", "\", "." etc.

Those skilled in the art will recognize that blocks in the above-mentioned flow chart could be arranged in a somewhat different order, but still describe the invention. Blocks could be added to the above-mentioned flow chart to describe details, or optional features; some blocks could be subtracted to show a simplified example.

In conclusion, we have shown examples of solutions for error-handling, recovery, and problem-solving.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

I claim:
1. A method for handling errors, said method comprising:
  detecting an occurrence of an incident in a thread executing in a runtime environment of a data processing system;

providing incident information regarding the incident to an incident filter, wherein the incident information identifies an incident type;

comparing, in the incident filter, the incident type of the incident to a list of incident types requiring further processing;

selecting the incident for further processing if the incident has an incident type that matches an incident type in the list of incident types requiring further processing;

identifying a diagnostic engine associated with the thread, wherein each thread in the runtime environment has a separate associated diagnostic engine; and determining if data capture for the incident is to be performed based on a list of recent incidents processed by the identified diagnostic engine, wherein if the incident is selected for further processing and data capture for the incident is to be performed, the method further comprises:

capturing data associated with said incident;

outputting captured data; and outputting a description for said captured data, whereby problem-solving is promoted.

2. The method of claim 1, further comprising:

keeping code for said capturing substantially separate from in-line paths.

3. The method of claim 1, wherein the list of incident types that require further processing is maintained in the identified diagnostic engine.

4. The method of claim 1, wherein determining if data capture for the incident is to be performed based on a list of recent incidents processed by the identified diagnostic engine further comprises:

preventing multiple invocation of said capturing data for a same incident based on the list of recent incidents processed by the identified diagnostic engine.

5. The method of claim 1, wherein said capturing further comprises at least one action chosen from:

producing a thread dump;

producing a process dump; and producing a core dump.

6. The method of claim 1, wherein said capturing further comprises:

parsing exceptions; and based on said parsing, selecting data for capture.

7. The method of claim 1, wherein said capturing further comprises:

performing operations on multiple servers.

8. The method of claim 1, further comprising:

customizing said capturing based on said incident's characteristics.

9. The method of claim 1, further comprising:

comparing a current incident to known incidents; and if a match is found, retrieving information that is relevant to said current incident.

10. The method of claim 1, further comprising:

taking corrective action in response to said incident.

11. The method of claim 1 further comprising:

creating a diagnostic module;

registering said diagnostic module with the identified diagnostic engine; and making data available to said diagnostic module.

12. The method of claim 1, further comprising:

bundling said incident in a persistent form that gathers data from multiple components.

13. The method of claim 1, wherein said capturing further comprises:

initiating boundaries for an incident;

capturing general data for said incident, logging data from components that are involved with said incident; and bundling output when processing is complete.

14. The method of claim 13, wherein said initiating boundaries further comprises at least one action chosen from:

associating an incident with an output stream; and creating an output stream for said incident.

15. The method of claim 13, wherein said capturing general data further comprises capturing at least one item chosen from:

date;

timestamp;

classpath;

class loader; and configuration settings.

16. The method of claim 1, further comprising:

suppressing said capturing during certain states.

17. The method of claim 1, further comprising:

temporarily logging data that can be retrieved later if an incident occurs.

18. The method of claim 1, further comprising:

comparing a current incident to known incidents; and if a match is found, retrieving information that is relevant to said current incident.

19. The method of claim 1, further comprising:

taking corrective action in response to said incident.

20. A system for handling errors, said system comprising:

means for detecting an occurrence of an incident in a thread executing in a runtime environment of a data processing system;

means for providing incident information regarding the incident to an incident filter, wherein the incident information identifies an incident type;

means for comparing, in the incident filter, the incident type of the incident to a list of incident types requiring further processing;

means for selecting the incident for further processing if the incident has an incident type that matches an incident type in the list of incident types requiring further processing;

means for identifying a diagnostic engine associated with the thread, wherein each thread in the runtime environment has a separate associated diagnostic engine;

means for determining if data capture for the incident is to be performed based on a list of recent incidents processed by the identified diagnostic engine;

means for capturing data associated with said incident;

means for outputting captured data; and means for outputting a description for said captured data, wherein said means for capturing data, means for outputting captured data, and means for outputting a description of said captured data operate if the incident is selected for further processing and data capture for the incident is to be performed.

21. The system of claim 20, wherein said means for capturing further comprises:

code that is substantially separate from in-line paths.

22. The system of claim 20, wherein the list of incident types that require further processing is maintained in the identified diagnostic engine.

23. The system of claim 20, wherein said means for determining if data capture for the incident is to be performed based on a list of recent incidents processed by the identified diagnostic engine further comprises:

means for preventing multiple invocation of said means for capturing data, for a same incident based on the list of recent incidents processed by the identified diagnostic engine.

24. The system of claim 20, wherein said means for capturing further comprises means for performing at least one action chosen from:
   producing a thread dump;
   producing a process dump; and
   producing a core dump.

25. The system of claim 20, wherein said means for capturing further comprises:
   means for parsing exceptions; and
   means responsive to said parsing, for selecting data for capture.

26. The system of claim 20, wherein said means for capturing further comprises:
   means for performing operations on multiple servers.

27. The system of claim 20, further comprising:
   means for customizing said means for capturing, based on said incident's characteristics.

28. The system of claim 20, further comprising:
   means for comparing a current incident to known incidents; and means for retrieving information that is relevant to said current incident, if a match is found.

29. The system of claim 20, further comprising:
   means for taking corrective action in response to said incident.

30. A computer readable storage medium having computer-executable instructions for handling errors, said computer-executable instructions comprising:
   means for detecting an occurrence of an incident in a thread executing in a runtime environment of a data processing system;
   means for providing incident information regarding the incident to an incident filter, wherein the incident information identifies an incident type;
   means for comparing, in the incident filter, the incident type of the incident to a list of incident types requiring further processing;
   means for selecting the incident for further processing if the incident has an incident type that matches an incident type in the list of incident types requiring further processing;
   means for identifying a diagnostic engine associated with the thread, wherein each thread in the runtime environment has a separate associated diagnostic engine;
   means for determining if data capture for the incident is to be performed based on a list of recent incidents processed by the identified diagnostic engine;
   means for capturing data associated with said incident;
   means for outputting captured data; and
   means for outputting a description for said captured data, wherein said means for capturing data, means for outputting captured data, and means for outputting a description of said captured data operate if the incident is selected for further processing and data capture for the incident is to be performed.

31. The computer readable storage medium of claim 30, wherein said means for capturing further comprises:
   code that is substantially separate from in-line paths.

32. The computer readable storage medium of claim 30, wherein the list of incident types that require further processing is maintained in the identified diagnostic engine.

33. The computer readable storage medium of claim 30, wherein said means for determining if data capture for the incident is to be performed based on a list of recent incidents processed by the identified diagnostic engine further comprises:
   means for preventing multiple invocation of said means for capturing data, for a same incident based on the list of recent incidents processed by the identified diagnostic engine.

34. The computer readable storage medium of claim 30, wherein said means for capturing further comprises means for performing at least one action chosen from:
   producing a thread dump;
   producing a process dump; and
   producing a core dump.

35. The computer readable storage medium of claim 30, wherein said means for capturing further comprises:
   means for parsing exceptions; and
   means responsive to said parsing, for selecting data for capture.

36. The computer readable storage medium of claim 30, wherein said means for capturing further comprises:
   means for performing operations on multiple servers.

37. The computer readable storage medium of claim 30, further comprising:
   means for customizing said means for capturing, based on said incident's characteristics.

38. The computer readable storage medium of claim 30, further comprising:
   means for comparing a current incident to known incidents; and
   means for retrieving information that is relevant to said current incident, if a match is found.

39. The computer readable storage medium of claim 30, further comprising:
   means for taking corrective action in response to said incident.

* * * * *